United States Patent
Ye

(10) Patent No.: US 11,284,243 B2
(45) Date of Patent: Mar. 22, 2022

(54) METHOD AND DEVICE FOR SUBSCRIBING SOCIAL NETWORK SERVICE

(71) Applicant: Telefonaktiebolaget LM Ericsson (publ), Stockholm (SE)

(72) Inventor: Yinghai Ye, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/642,297

(22) PCT Filed: Aug. 29, 2017

(86) PCT No.: PCT/CN2017/099403
§ 371 (c)(1),
(2) Date: Feb. 26, 2020

(87) PCT Pub. No.: WO2019/041115
PCT Pub. Date: Mar. 7, 2019

(65) Prior Publication Data
US 2020/0204980 A1  Jun. 25, 2020

(51) Int. Cl.
*H04W 8/18* (2009.01)
*H04L 12/58* (2006.01)
(Continued)

(52) U.S. Cl.
CPC ............. *H04W 8/18* (2013.01); *G06Q 50/01* (2013.01); *H04L 51/14* (2013.01); *H04L 51/32* (2013.01); *H04L 67/26* (2013.01); *H04L 67/306* (2013.01)

(58) Field of Classification Search
CPC ......... H04W 8/18; G06Q 50/01; H04L 51/14; H04L 51/32; H04L 67/26; H04L 67/306; H04L 29/06
See application file for complete search history.

(56) References Cited

U.S. PATENT DOCUMENTS

| 10,963,890 B1 * | 3/2021 | Kim ...................... G06Q 30/02 |
| 2007/0016674 A1 | 1/2007 | Shinohara et al. |

(Continued)

FOREIGN PATENT DOCUMENTS

| CN | 105282118 A | 1/2016 |
| CN | 1052288111 A | 1/2016 |
| EP | 2 107 516 A1 | 10/2009 |

OTHER PUBLICATIONS

International Search Report and Written Opinion issued in International Application No. PCT/CN2017/099403 dated May 30, 2018 (9 pages).

*Primary Examiner* — Soe Hlaing
(74) *Attorney, Agent, or Firm* — Christopher & Weisberg, P.A.

(57) ABSTRACT

A method and device for subscribing social network service. The method includes: receiving a message to be published for a subscription of social network service; retrieving one or more subscribers following the subscription according to prestored subscription relationship information; and feeding the message to the one or more subscribers following the subscription such that one or more actions associated with change information of the subscription is/are applied on the subscribers. Therefore, it will easily support a lot of business use cases utilizing subscription relationship and message feed service. Furthermore, new business cases of provisioning can be produced based on this service.

20 Claims, 6 Drawing Sheets

(51) Int. Cl.
*H04L 29/08* (2006.01)
*G06Q 50/00* (2012.01)
*H04L 51/00* (2022.01)
*H04L 51/52* (2022.01)
*H04L 67/55* (2022.01)
*H04L 67/306* (2022.01)

(56) References Cited

U.S. PATENT DOCUMENTS

| | | | |
|---|---|---|---|
| 2007/0162432 A1* | 7/2007 | Armstrong | G06F 16/9535 |
| 2010/0255812 A1 | 10/2010 | Nanjundaiah et al. | |
| 2012/0059795 A1* | 3/2012 | Hersh | G06F 7/78 |
| | | | 707/628 |
| 2012/0174169 A1 | 7/2012 | Nandiraju | |
| 2012/0210366 A1 | 8/2012 | Wong et al. | |
| 2013/0080538 A1* | 3/2013 | McEachern | H04L 51/32 |
| | | | 709/206 |
| 2013/0138738 A1 | 5/2013 | Li et al. | |
| 2014/0344895 A1* | 11/2014 | Jimenez Arreola | H04L 67/18 |
| | | | 726/4 |
| 2017/0118304 A1* | 4/2017 | Ratiu | H04L 67/26 |
| 2017/0134523 A1 | 5/2017 | Wu | |
| 2018/0241713 A1* | 8/2018 | Subba | H04L 51/32 |

* cited by examiner

METHOD AND DEVICE FOR SUBSCRIBING SOCIAL NETWORK SERVICE

CROSS REFERENCE TO RELATED APPLICATION(S)

This application is a 35 U.S.C. § 371 National Stage of International Patent Application No. PCT/CN2017/099403, filed Aug. 29, 2017, designating the United States, the disclosure of which is incorporated by reference.

TECHNICAL FIELD

Embodiments of the present disclosure generally relate to the field of communications, and more particularly, to a method and device for subscribing social network service.

BACKGROUND

This section introduces aspects that may facilitate better understanding of the present disclosure. Accordingly, the statements of this section are to be read in this light and are not to be understood as admissions about what is in the prior art or what is not in the prior art.

A provisioning system stands in a middle of a business support system (BSS) and a plurality of network elements. The provisioning system may receive a plurality of customer service orders (CSO) from the BSS, and may build network service orders (NSO) and orchestrate an activation of subscription data among the network elements.

A subscription may describe a commercial relationship between a subscriber and a service provider. A telecom subscription is normally uniquely identified by a key attribute, e.g. mobile subscriber international integrated service digital network (MSISDN) number, international mobile subscriber identification (IMSI) number, etc.

The BSS may send a provisioning command to the provisioning system to create, update, delete or get the subscription data in an operator network. In the provisioning command, there is a key attribute uniquely identifying the subscription and optionally there are other parameters setting some properties of the subscription.

SUMMARY

The inventors found that the subscriptions themselves are independent to each other from the provisioning system perspective. Although there are some relations between different subscriptions, e.g. subscribed to a common service, having a common profile, etc., the provisioning system is not able to utilize this information for business cases purpose.

In order to solve at least part of the above problems, methods, apparatus, devices and computer programs are provided in the present disclosure. It may be appreciated that embodiments of the present disclosure are not limited to a wireless system, but could be more widely applied to any application scenario where similar problems exist.

Various embodiments of the present disclosure mainly aim at providing methods, devices and computer programs for controlling a transmission between a transmitter and a receiver. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of example, the principles of embodiments of the present disclosure.

In general, embodiments of the present disclosure provide a solution for subscribing social network service. A message for a subscription of social network service is fed or published in a social network; and one or more actions associated with change information of the subscription may be applied.

In a first aspect, there is provided a method of operating a network device. The method includes: receiving a message to be published for a subscription of social network service; the message comprises change information of the subscription; retrieving one or more subscribers following the subscription according to prestored subscription relationship information; and feeding the message to the one or more subscribers following the subscription such that one or more actions associated with the change information of the subscription is/are applied on the subscribers.

In an embodiment, the method further includes: scheduling a message for an automatic subscription of social network service; retrieving one or more subscribers following the automatic subscription according to the prestored subscription relationship information; and feeding the message to the one or more subscribers following the automatic subscription.

In an embodiment, the method further includes: publishing the message to one or more terminal devices in a social network.

In an embodiment, the method further includes: receiving a register request from a terminal device; and joining the terminal device into the social network according to the register request.

In an embodiment, the method further includes: finding one or more rules associated with the subscription; and applying one or more actions associated with the one or more rules on the subscription.

In an embodiment, the method further includes: updating one or more subscription relationship according to the applied actions associated with the rules.

In an embodiment, the method further includes: triggering a provisioning message to a provisioning system.

In an embodiment, the method further includes: reducing a content of the message to acquire one or more parameters and/or one or more value pairs.

In an embodiment, the subscription relationship information is prestored in a subscription relationship database; and the subscription relationship information at least comprises a list of subscribers following the subscription and a list of subscribers being followed by the subscription.

In an embodiment, the subscription relationship information comprises one or more of the following: a community which the subscription belongs to, a service which the subscription has activated, a topic which the subscription cares about.

In an embodiment, the method further includes: one or more rules are used to perform feeding the message.

In an embodiment, the message is recorded by one or more other subscriptions which the subscription follows, and/or, the message is recorded by one or more other subscriptions which pushes the message to the subscription.

In an embodiment, the message is transmitted by a provisioning system or a terminal device and comprises one or more logging requests; and a provisioning request is transmitted to the provisioning system based on the fed message.

In an embodiment, one or more rules are prestored in a rule engine; and the rule comprises one or more of the following: an effective time span, a subscription filter, a relation filter, a message filter and one or more actions to take.

In a second aspect, there is provided a method of operating a terminal device. The method includes: sending a message to be published for a subscription of social network service; wherein the message comprises change information of the subscription; one or more subscribers following the subscription is/are fed by the message and one or more actions associated with the change information of the subscription is/are applied on the subscribers.

In an embodiment, one or more subscribers following an automatic subscription of social network service is/are fed by a message for the automatic subscription.

In an embodiment, the message is published to one or more terminal devices in a social network.

In an embodiment, the method further includes: sending a register request to a network device such that the terminal device is joined into the social network according to the register request.

In a third aspect, there is provided a method of operating a terminal device. The method includes: receiving a message fed by a network device; the message is used for a subscription of social network service and comprises change information of the subscription; and applying one or more actions associated with the change information of the subscription.

In a fourth aspect, there is provided a network device, including a processor and a memory. The memory containing instructions executable by the processor whereby the network device is operative to perform a method according to the first aspect.

In a fifth aspect, there is provided a terminal device, including a processor and a memory. The memory containing instructions executable by the processor whereby the terminal device is operative to perform a method according to the second and third aspects.

According to various embodiments of the present disclosure, a social network service may connect different subscriptions together. Therefore, it will easily support a lot of business use cases utilizing subscription relationship and message feed service. Furthermore, new business cases of provisioning can be produced based on this service.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
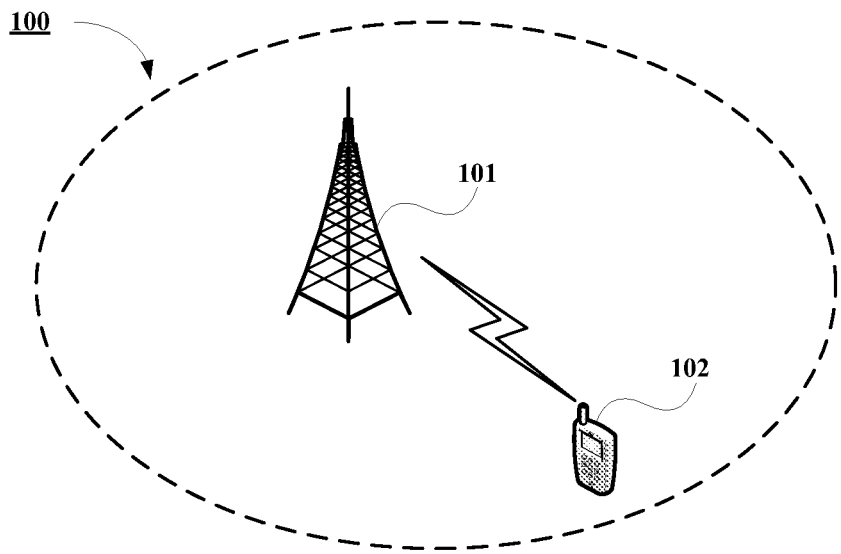
FIG. 1 is a schematic diagram which shows a wireless communication network.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Now some exemplary embodiments of the present disclosure will be described below with reference to the figures.

FIG. 1 shows a schematic diagram of a wireless communication network 100 in which embodiments of the disclosure may be implemented. As shown in FIG. 1, the wireless communication network 100 may include one or more network devices, for example network devices 101.

It will be appreciated that the network device 101 could also be in a form of gNB, Node B, eNB, BTS (Base Transceiver Station), and/or BSS (Base Station Subsystem), access point (AP) and the like. The network device 101 may provide radio connectivity to a set of terminal devices or UEs 102-1, 102-2, . . . , 102-N (collectively referred to as "terminal device(s) 102) within its coverage, where N is a natural number.

The network device 101 includes processing circuitry, device readable medium, interface, user interface equipment, auxiliary equipment, power source, power delivery circuitry, and antenna. These components are depicted as single boxes located within a single larger box, and in some cases, contain additional boxes therein.

In practice, however, the network device 101 may include multiple different physical components that make up a single illustrated component (e.g., interface includes ports/terminals for coupling wires for a wired connection and radio front end circuitry for a wireless connection). As another example, network device 101 may be a virtual network node. Similarly, network node may be composed of multiple physically separate components (e.g., a NodeB component and a RNC component, a BTS component and a BSC component, etc.), which may each have their own respective components.

In certain scenarios in which network device includes multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node may be configured to support multiple radio access technologies (RATs). In such embodiments, some components may be duplicated (e.g., separate device readable medium for the different RATs) and some components may be reused (e.g., the same antenna may be shared by the RATs).

Although network device 101 illustrated in the example wireless communication network may represent a device that includes a particular combination of hardware components, other embodiments may include network nodes with different combinations of components. It is to be understood that a network device may include any suitable combination of hardware and/or software needed to perform the tasks, features, functions and methods disclosed herein.

It is to be understood that the configuration of FIG. 1 is described merely for the purpose of illustration, without suggesting any limitation as to the scope of the present disclosure. Those skilled in the art would appreciate that the wireless communication network 100 may include any suitable number of terminal devices and/or network devices and may have other suitable configurations.

Nowadays, in order to do provisioning or activation, the BSS must know and specify exact subscriptions and operations. It is not easy for the BSS to filter discrete subscriptions from the network for candidates of the provisioning.

In existing solutions, a subscription inventory which stores subscription data and subscribed services may be introduced to keep track on subscription changes, but it requires change of inventory schema when introducing new services.

On the other hand, a social network service (also may be referred to as a social networking site, a social networking service or a social media, and so on) may be an online platform that is used by people to build social networks or social relations with other people who share similar personal or career interests, activities, backgrounds or real-life connections.

In this disclosure, a subscription of social network service may be automatically built during some normal provisioning operations through logging process. Subscriptions instead of transactions are the subject of logging records which describe a plurality of changes happened to the subscriptions.

Therefore, the subscription of social network service is utilized to easily support group and automatic mutual interactions among subscriptions, for example, massive provisioning, data optimization and correction, etc.

In this disclosure, a subscription of social network service may build up a social network which connects different subscriptions together. Therefore, it will easily support a lot of business use cases utilizing subscription relationship and message feed service. Furthermore, new business of provisioning can be produced based on this service.

It should be appreciated that the subscription in this disclosure is of a social network service, and a plurality of subscribers are grouped into a social network. The subscriber may be a telecom subscriber of a provisioning system, or may be a terminal device, or may be a part of a terminal device or a network device; and it is not limited thereto.

First Aspect of Embodiments

A method for subscribing social network service is provided in an embodiment. The method is implemented at a network device as an example.

Figure 2:
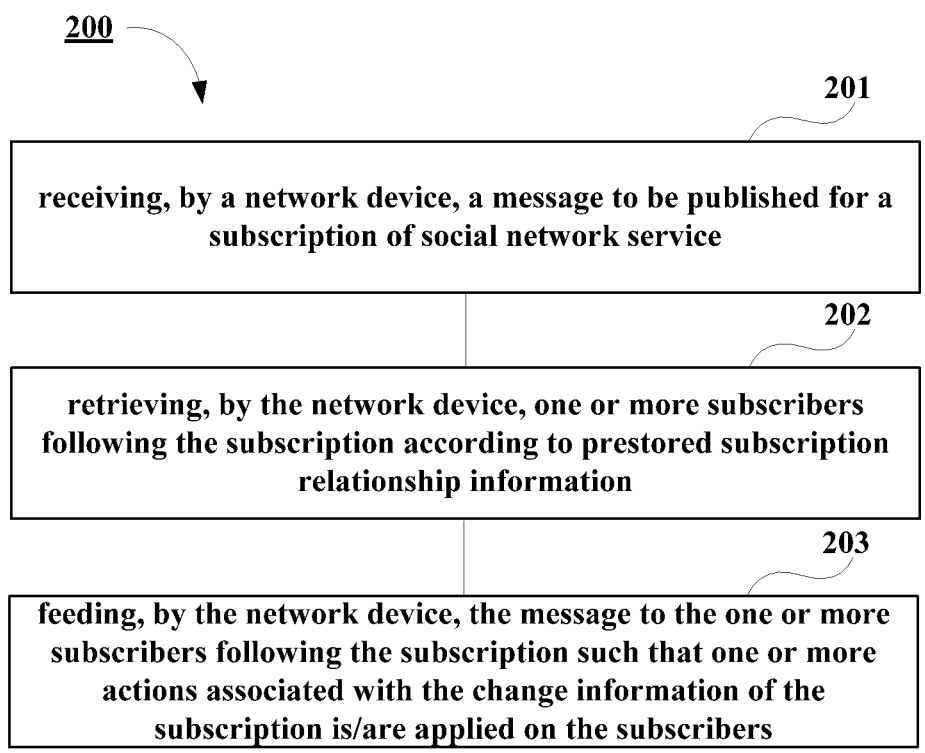
FIG. 2 is a flowchart which shows a method for subscribing social network service in accordance with an embodiment of the present disclosure.

FIG. 2 is a flowchart which shows a method 200 for subscribing social network service in accordance with an embodiment of the present disclosure, and illustrates the method for subscribing social network service as an example.

As shown in FIG. 2, the method 200 includes receiving, by a network device, a message to be published for a subscription of social network service, at block 201. The message includes change information of the subscription.

As shown in FIG. 2, the method 200 further includes retrieving, by the network device, one or more subscribers following the subscription according to prestored subscription relationship information, at block 202; and feeding, by the network device, the message to the one or more subscribers following the subscription such that one or more actions associated with the change information of the subscription is/are applied on the subscribers.

It should be appreciated that for the sake of simplicity, an authentication or authorization procedure is omitted in FIG. 2. one or more existing authentication mechanism may be used between a terminal device and the network device. In addition, one or more subscriptions may be connected to the social network service for security reasons, and it is not limited thereto.

Next, a subscriber of a provisioning system in a social network is used as an example, and it is not limited thereto. For example, the subscriber may be a terminal device in a social network.

Figure 3:
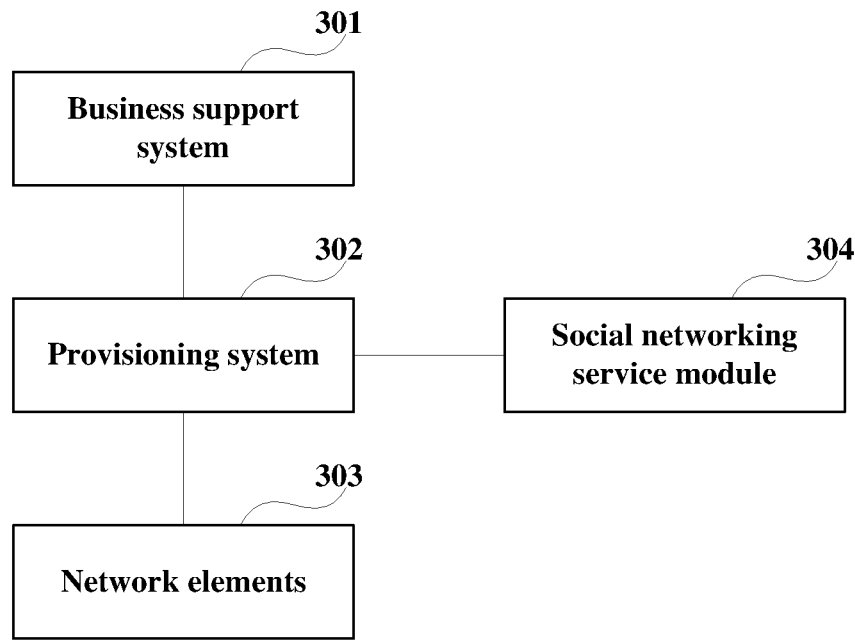
FIG. 3 is a block diagram which shows an example of subscription provisioning solution in accordance with an embodiment of the present disclosure.

FIG. 3 is a block diagram which shows an example of subscription provisioning solution in accordance with an embodiment of the present disclosure. As shown in FIG. 3, there exist a business support system 301, a provisioning system 302 and network elements 303. Furthermore, as shown in FIG. 3, a social networking service module 304 is provided in this disclosure and the social networking service module 304 is configured in the network device.

The social networking service module 304 may be a sub-system storing relationship information among a plurality of subscriptions as well as subscription change logs. It may also be a part of the provisioning system 302.

When the business support system 301 transmits a provisioning request towards the provisioning system 302, the provisioning system 302 may use the social networking service module 304 to create new subscription change logs and update subscription relationship, if needed, after a plurality of activations of the network elements 303 are performed. The social networking service module 304 may trigger one or more provisioning activities when certain criteria are met.

Figure 4:
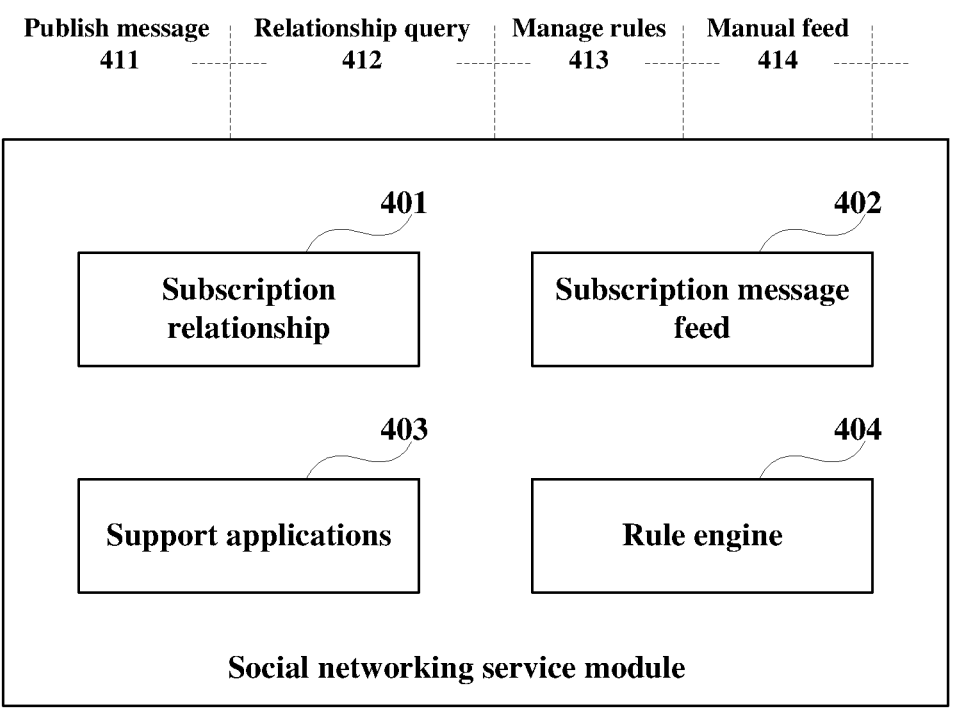
FIG. 4 is a schematic diagram which shows an implementation of the social networking service in accordance with an embodiment of the present disclosure.

FIG. 4 is a schematic diagram which shows an implementation of the social networking service in accordance with an embodiment of the present disclosure. As shown in FIG. 4, the social networking service module 304 may include some modules, such as subscription relationship 401, subscription message feed 402, support applications 403 and rule engine 404. Furthermore, the social networking service module 304 may include some services, such as publish message 411, relationship query 412, manage rules 413 and manual feed 414.

In an embodiment, the subscription relationship 401 is provided. The subscription relationship information may be prestored in a subscription relationship database; and the subscription relationship information may at least include a list of subscribers following the subscription and a list of subscribers being followed by the subscription.

In addition, the subscription relationship information may include one or more of the following: a community which the subscription belongs to, a service which the subscription has activated, a topic which the subscription cares about.

As one example, subscriptions may be uniquely identified by subscription keys, e.g. IMSI, MSISDN, etc. The subscription relationship may have two dimensions, such as a follower list and a following list, which are similar as that in human social networking services. For example, in Facebook people may pay attention to a plurality of movie stars while may be concerned by a plurality of friends.

As another example, there may be virtual subscriptions that are created and used by the sub-system to support various use cases. The virtual subscription may act as a community which subscription belongs to, e.g. long-term evolution (LTE) users, roaming users, etc.; alternatively, the virtual subscription may act as a service which subscription has activated, e.g. VoLTE, WiFi-calling, etc.; alternatively, the virtual subscription may act as a topic which subscription cares about, e.g. provisioning error code X for Y service, etc.

As another example, unlike human social networking services, e.g. Facebook, Twitter, etc., subscription information may not be stored in the social networking service module 304. The subscription information is normally not needed by the services provided the social networking service module 304, therefore, the subscription information is already stored somewhere in other network function nodes, e.g. HLR, HSS, CUDB, etc., and the social networking service module 304 can get the subscription information through the provisioning system 302 in case that the subscription information is needed.

In an embodiment, the subscription message feed 402 is provided. One or more rules may be used to perform feeding the message. For example, the message may be recorded by one or more other subscriptions which the subscription follows, and/or, the message may be recorded by one or more other subscriptions which pushes the message to the subscription.

As an example, the subscription message feed 402 may record changes according to rule configurations of the rule engine 404 whenever provisioning is executed by the provisioning system. The operation may be analogous to posting a message with a social media platform such as publishing a tweet in Twitter.

As another example, the subscription message feed 402 may also show the messages recorded by other subscriptions whom the subscription follows. Alternatively, the subscription message feed 402 may also show the messages recorded by other subscriptions who explicitly pushes message to the subscription, i.e. using the @ predicate similar to Twitter.

In an embodiment, the support applications 403 is provided. The message may be transmitted by a provisioning system or a terminal device and may include one or more logging requests; and a provisioning request may be transmitted to the provisioning system based on the fed message.

For example, the support applications 403 may perform implementing internal automated tasks, handling external communication and housekeeping work within the social networking service 304.

As one example, the support applications 403 may look up rules from the rule engine 404 to decide whether to perform additional operations when a subscription provisioning is processed; such as, establishing new relationship with other subscriptions in the subscription relationship database, publishing a message in the subscription message feed 402.

As another example, the support applications 403 may translate the request from the provisioning system into a publishable message. Alternatively, the support applications 403 may automatically perform message feed for subscriptions, and take actions according to configurations of the rule engine 404.

As another example, the support applications 403 may communicate with the provisioning system, such as, receiving provisioning logging requests from the provisioning system, alternatively, sending provisioning requests to the provisioning system based on the subscription's message feed.

In an embodiment, the rule engine 404 is provided. One or more rules may be prestored in the rule engine 404; and the rule may include one or more of the following: an effective time span, a subscription filter, a relation filter, a message filter and one or more actions to take.

For example, the rule engine 404 may be a database which stores the criteria for the social networking service 304 to perform operations automatically. A rule normally may contain one or more of the following information.

Such as, effective time span including a start time and an end time; subscription filter which may be numerical range, regular expression, or any subscription; relation filter, e.g. follows ABC, or is followed by abc; message filter, for example the latest published message containing key word XYZ.

In addition, the rule may also include actions to take. For example, creating a new relation, e.g. subscription start following another virtual subscription; alternatively, publishing a new message; alternatively, triggering a provisioning in the provisioning system.

In an embodiment, a service of the publish message 411 is provided. This service may be a fundamental service of the social networking service module 304. When a subscription provisioning is completed in the provisioning system 302, the provisioning system 302 may request the social networking service module 304 to publish a message for the subscription. The message body may only contain concise information about the changes on the subscription. A rough provisioning order can be attached or correlated with an identifier in case it will be used in certain business use cases.

In an embodiment, a service of the relationship query 412 is provided. This service is used to retrieve all the followers of a subscription or all the subscriptions the inquiry subscription has followed.

In an embodiment, a service of the manage rules 413 is provided. This service is used to add, delete, modify and view rules in the rule engine 404.

In an embodiment, a service of the manual feed 414 is provided. This service is used to feed message for a subscription, so that it can get the latest update of what is going among other subscriptions it follows and take actions according to configured rules.

It should be appreciated that the social networking service module 304 configured in the network device is illustrated as an example, but is not limited thereto. For example, other modules or services may be adopted according to actual scenarios.

Figure 5:
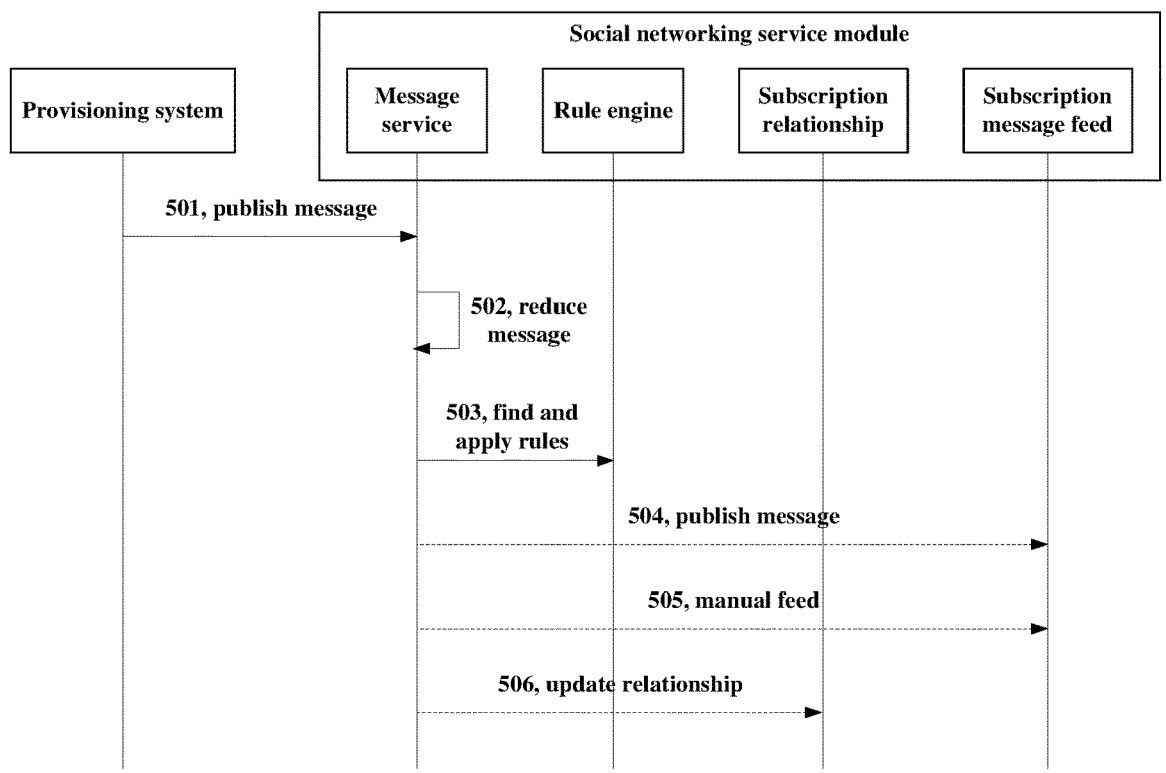
FIG. 5 is a schematic diagram which shows an example of business process flow of provisioning in accordance with an embodiment of the present disclosure.

FIG. 5 is a schematic diagram which shows an example of business process flow of provisioning in accordance with an embodiment of the present disclosure.

As shown in FIG. 5, the business process flow may include: transmitting, by a provisioning system, a message to the support applications of the social networking service, at 501.

For example, after a provisioning service order is completed by the provisioning system, a publish message is sent to a message service which is provided by the support applications 403. The request may contain the subscription identity and the service order. Furthermore, the message may be transmitted by a terminal device in a social network and the social networking service may be configured in a network device.

As shown in FIG. 5, the business process flow may further include: reducing a content of the message to acquire one or more parameters and/or one or more value pairs, at 502.

As shown in FIG. 5, the business process flow may further include: finding one or more rules associated with the subscription; and applying one or more actions associated with the one or more rules on the subscription, at 503.

As shown in FIG. 5, the business process flow may further include: optionally, publishing the message, at 504.

For example, a message record may be automatically published for the subscription; and the message may be published to one or more terminal devices in the social network.

As shown in FIG. 5, the business process flow may further include: optionally, feeding the message to the one or more subscribers, at 505.

For example, a manual feed of the subscription's message may trigger other rules as well.

As shown in FIG. 5, the business process flow may further include: optionally, updating one or more subscription relationship according to the applied actions associated with the rules, at 506.

For example, the subscription's and other subscription's relationship may also be updated according to rule configuration.

In an embodiment, the social networking service may schedule automatic message feed for every subscription regularly.

Figure 6:
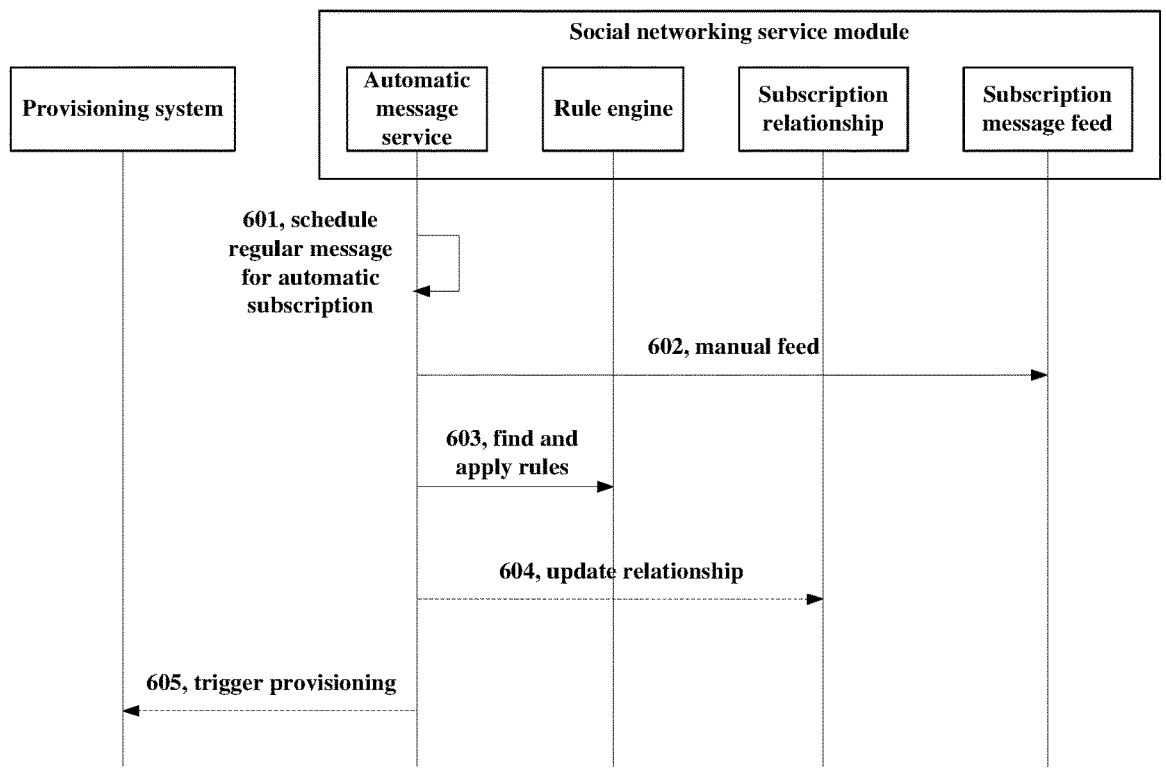
FIG. 6 is a schematic diagram which shows an example of business process flow of automatically provisioning in accordance with an embodiment of the present disclosure.

FIG. 6 is a schematic diagram which shows an example of business process flow of automatically provisioning in accordance with an embodiment of the present disclosure.

As shown in FIG. 6, the business process flow may include: scheduling a message for an automatic subscription of social network service, at 601.

For example, the support applications 403 may provide an automatic message service and the automatic message service may trigger message feed for a subscription and a message feed frequency may be decided by activeness of subscriptions.

As shown in FIG. 6, the business process flow may include: feeding the message to the one or more subscribers following the automatic subscription, at 602.

For example, one or more subscribers following the automatic subscription may be retrieved according to the prestored subscription relationship information and a message feed is played for the subscription.

As shown in FIG. 6, the business process flow may further include: finding one or more rules associated with the subscription; and applying one or more actions associated with the one or more rules on the subscription, at 603.

For example, the automatic message service may look up the rule engine to find applicable rules to take further actions.

As shown in FIG. 6, the business process flow may further include: optionally, updating one or more subscription relationship according to the applied actions associated with the rules, at 604.

As shown in FIG. 6, the business process flow may further include: optionally, triggering a provisioning message to the provisioning system.

It should be appreciated that FIGS. 5 and 6 are examples of the disclosure, but it is not limited thereto. For example, the order of operations at blocks (or steps) may be adjusted and/or some blocks (or steps) may be omitted. Moreover, some blocks (or steps) not shown in FIGS. 5 and 6 may be added.

It should be appreciated that a provisioning system in a social network is used as an example in the above embodiments, and it is not limited thereto. Next, a terminal device in a social network is used as an example.

In an embodiment, the network device may receive a register request from a terminal device; and join the terminal device into the social network according to the register request. Furthermore, when the network device receives a message to be published for a subscription from a terminal device in the social network, the message may be published to one or more terminal devices in the social network.

For example, a social network may include a terminal device 1, 2, . . . , N and the social network may be managed by one or more network devices in cloud. When the terminal device transmit a message including change information of a parameter configuration, the message may be fed or published to the other terminal devices in the social network and one or more actions associated with the change information may be applied on the other terminal devices.

In this disclosure, flexible and automatic subscription group management could be achieved. For example, subscription social network is built up along with normal provisioning process. There is no limitation in number of groups or services a subscription can have.

In addition, massive update of subscriptions could be realized. For example, massive update of subscriptions can be triggered by a message feed with the follower subscriptions; and the BSS does not have to know the exact subscriptions to be updated.

In addition, the subscription issues may be automatically fixed. For example, using the message feed of related subscriptions, a subscription is able to fix same issues by automatically provisioning with the same solutions.

Furthermore, subscription history tracking could be realized. For example, not only the changes of the subscription itself are recorded, but also related subscriptions followed by the subscription are recorded. The information can be used for decision making when issues happen on the subscription.

As can be seen from the above embodiments, a social network service may connect different subscriptions together. Therefore, it will easily support a lot of business use cases utilizing subscription relationship and message feed service. Furthermore, new business cases of provisioning can be produced based on this service.

Second Aspect of Embodiments

A method for subscribing social network service is provided in an embodiment. The method is implemented at a terminal device as an example, and the same contents as those in the first aspect of embodiments are omitted.

Figures 7, 8:
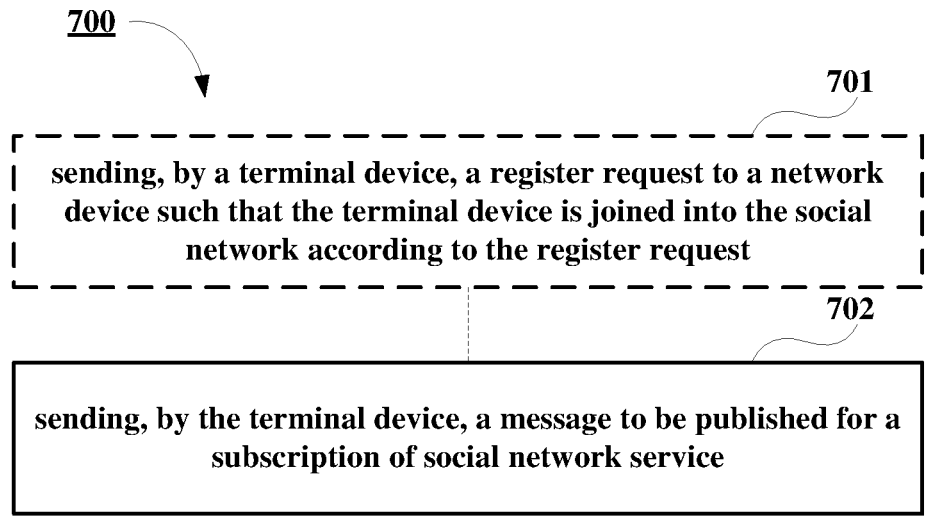
FIG. 7 is another flowchart which shows a method for subscribing social network service in accordance with an embodiment of the present disclosure.
FIG. 8 is another flowchart which shows a method for subscribing social network service in accordance with an embodiment of the present disclosure.

FIG. 7 is a flowchart which shows a method 700 for subscribing social network service in accordance with an embodiment of the present disclosure, and illustrates the method for subscribing social network service as an example.

As shown in FIG. 7, the method 700 includes sending, by a terminal device, a message to be published for a subscription of social network service, at block 702. The message may include change information of the subscription; furthermore, one or more subscribers following the subscription may be fed by the message and one or more actions associated with the change information of the subscription may be applied on the subscribers.

In an embodiment, the one or more subscribers following an automatic subscription may be fed by a message for the automatic subscription.

In an embodiment, the message may be published to one or more terminal devices in a social network.

As shown in FIG. 7, the method 700 may further include sending, by the terminal device, a register request to a network device such that the terminal device is joined into the social network according to the register request, at block 701.

FIG. 8 is a flowchart which shows a method 800 for subscribing social network service in accordance with an embodiment of the present disclosure, and illustrates the method for subscribing social network service as an example.

As shown in FIG. 8, the method 800 includes receiving, by a terminal device, a message fed by a network device, at block 801; the message is used for a subscription of social network service and includes change information of the subscription; and applying, by the terminal device, one or more actions associated with the change information of the subscription.

As can be seen from the above embodiments, a social network service may connect different subscriptions together. Therefore, it will easily support a lot of business use cases utilizing subscription relationship and message feed service. Furthermore, new business cases of provisioning can be produced based on this service.

Third Aspect of Embodiments

An apparatus for subscribing social network service is provided in an embodiment. The apparatus may be the network device 101 or may be configured in the network device 101, and the same contents as those in the second aspect of embodiments are omitted.

FIG. 8 shows a block diagram of an apparatus 800 for subscribing social network service in accordance with an embodiment of the present disclosure.

Figure 9:
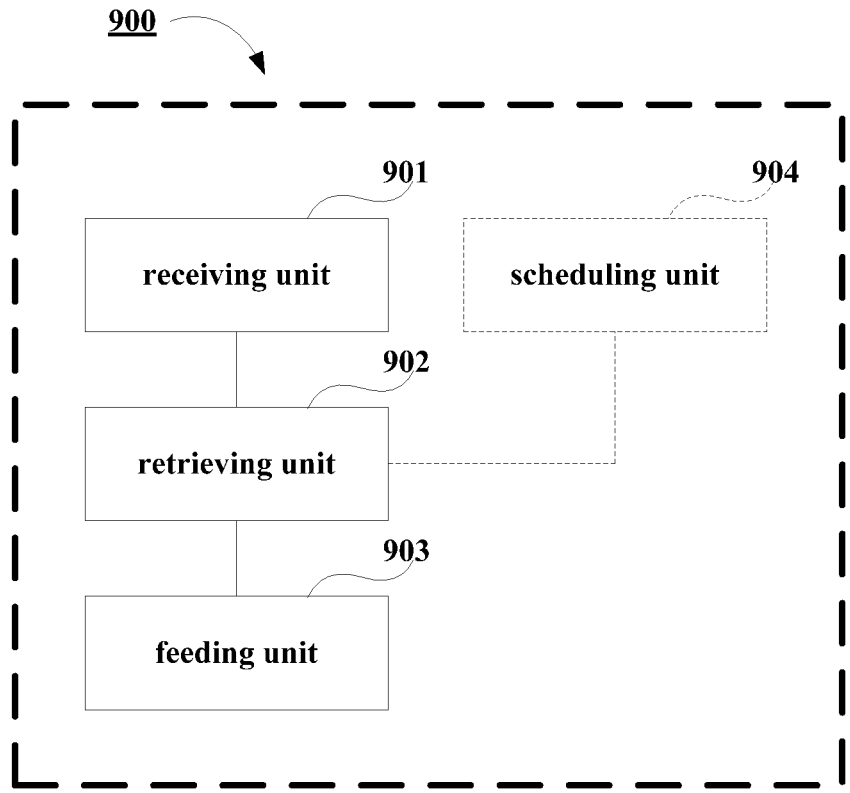
FIG. 9 is a block diagram which shows an apparatus for subscribing social network service in accordance with an embodiment of the present disclosure.

As shown in FIG. 9, the apparatus 900 includes: a receiving unit 901 configured to receive a message to be published for a subscription; the message comprising change information of the subscription; a retrieving unit 902 configured to retrieve one or more subscribers following the subscription according to prestored subscription relationship information; and a feeding unit 903 configured to feed the message to the one or more subscribers following the subscription such that one or more actions associated with the change information of the subscription is/are applied on the subscribers.

In an embodiment, the apparatus 900 may further include: a scheduling unit 904 configured to schedule a message for an automatic subscription; the retrieving unit 902 is further configured to retrieve one or more subscribers following the subscription according to the prestored subscription relationship information; and the feeding unit 903 is further configured to feed the message to the one or more subscribers following the automatic subscription.

In an embodiment, the feeding unit 903 is further configured to publish the message to one or more terminal devices in a social network.

It should be appreciated that components included in the apparatus 900 correspond to the operations of the method 200. Therefore, all operations and features described above with reference to FIG. 2 is likewise applicable to the components included in the apparatus 900 and have similar effects. For the purpose of simplification, the details will be omitted.

It should be appreciated that the components included in the apparatus 900 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 900 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 900 may be a part of a device. But it is not limited thereto, for example, the apparatus 900 may be the network device 101, other parts of the network device 101, such as transmitter and receiver, are omitted in the FIG. 9.

As can be seen from the above embodiments, a social network service may connect different subscriptions together. Therefore, it will easily support a lot of business use cases utilizing subscription relationship and message feed service. Furthermore, new business cases of provisioning can be produced based on this service.

Fourth Aspect of Embodiments

An apparatus for subscribing social network service is provided in an embodiment. The apparatus may be the terminal device 102 or may be configured in the terminal device 102, and the same contents as those in the first aspect of embodiments are omitted.

Figure 10:
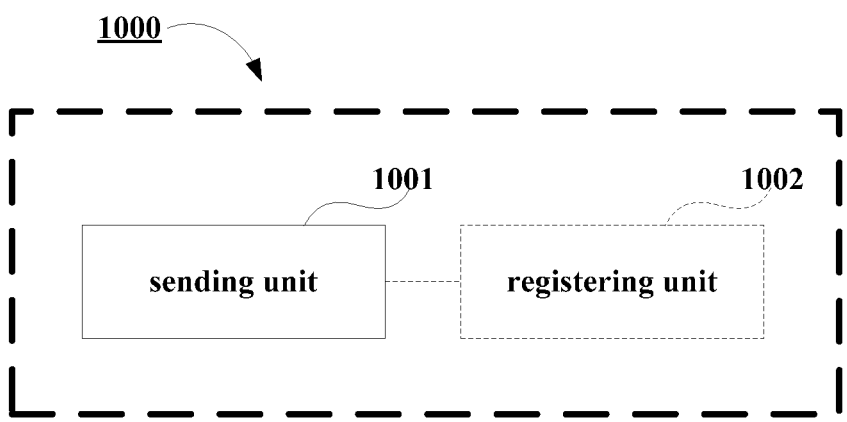
FIG. 10 is another block diagram which shows an apparatus for subscribing social network service in accordance with an embodiment of the present disclosure.

FIG. 10 shows a block diagram of an apparatus 1000 for subscribing social network service in accordance with an embodiment of the present disclosure.

As shown in FIG. 10, the apparatus 1000 includes: a sending unit 1001 configured to send a message to be published for a subscription of social network service. The message includes change information of the subscription; one or more subscribers following the subscription may be fed by the message and one or more actions associated with the change information of the subscription may be applied on the subscribers.

In an embodiment, one or more subscribers following an automatic subscription may be fed by a message for the automatic subscription.

In an embodiment, the message may be published to one or more terminal devices in a social network.

As shown in FIG. 10, the apparatus 1000 may further include: a registering unit 1002 configured to send a register request to a network device such that the terminal device is joined into the social network according to the register request.

Figure 11:
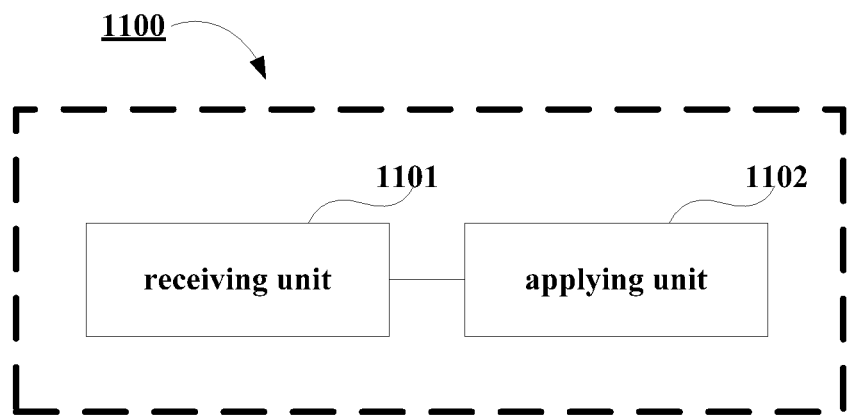
FIG. 11 is another block diagram which shows an apparatus for subscribing social network service in accordance with an embodiment of the present disclosure.

FIG. 11 shows a block diagram of an apparatus 1100 for subscribing social network service in accordance with an embodiment of the present disclosure.

As shown in FIG. 11, the apparatus 1100 includes: a receiving unit 1101 configured to receive a message fed by a network device, the message is used for a subscription of social network service and includes change information of the subscription; and an applying unit 1102 configured to apply one or more actions associated with the change information of the subscription.

It should be appreciated that components included in the apparatus 1000 or 1100 correspond to the operations of the method 700 or 800. Therefore, all operations and features described above with reference to FIG. 7 or 8 is likewise applicable to the components included in the apparatus 1000 or 1100 and have similar effects. For the purpose of simplification, the details will be omitted.

It should be appreciated that the components included in the apparatus 1000 or 110 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 1000 or 110 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 1000 or 110 may be a part of a device. But it is not limited thereto, for example, the apparatus 1000 or 110 may be the terminal device 102, other parts of the terminal device 102, such as transmitter and receiver, are omitted in the FIG. 10 or 11.

As can be seen from the above embodiments, a social network service may connect different subscriptions together. Therefore, it will easily support a lot of business use cases utilizing subscription relationship and message feed service. Furthermore, new business cases of provisioning can be produced based on this service.

Fifth Aspect of Embodiments

A communications system is provided, as shown in FIG. 1, the communication system 100 includes a network device 101 configured to perform a method for subscribing social network service according to the first aspect of embodiments and a terminal device 102 configured to perform a method for subscribing social network service according to the second aspect of embodiments.

A device (such as a network device 101 or a terminal device 102) is provided in an embodiment, and the same contents as those in the first to fourth aspects of embodiments are omitted.

Figure 12:
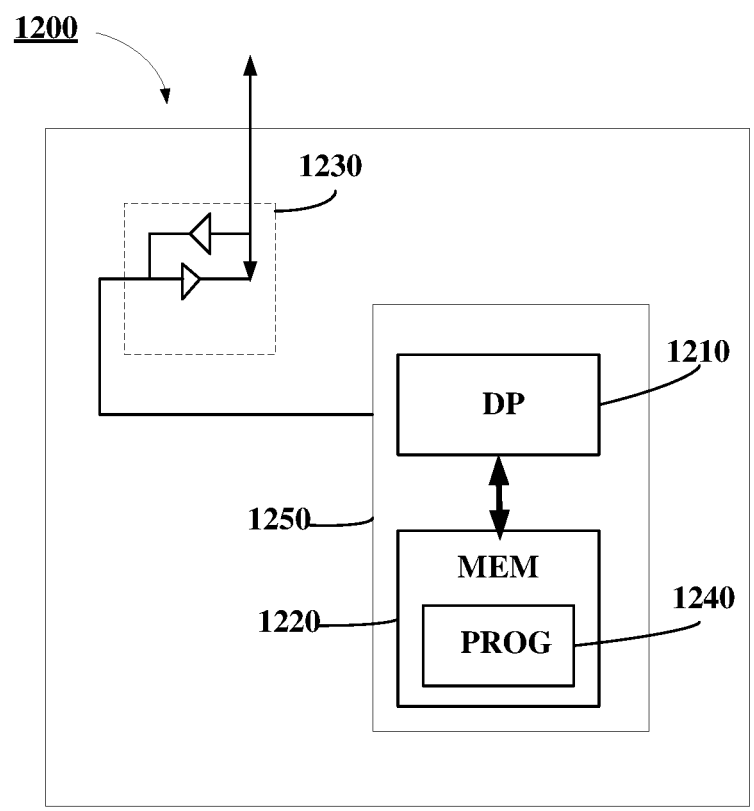
FIG. 12 is a simplified block diagram of a device that is suitable for implementing embodiments of the present disclosure.

FIG. 12 shows a simplified block diagram of a device 1200 that is suitable for implementing embodiments of the present disclosure. It would be appreciated that the device 1200 may be implemented as at least a part of, for example, the network device 101 or the terminal device 102.

As shown, the device 1200 includes a communicating means 1230 and a processing means 1250. The processing means 1250 includes a data processor (DP) 1210, a memory (MEM) 1220 coupled to the DP 1210. The communicating means 1230 is coupled to the DP 1210 in the processing means 1250. The MEM 1220 stores a program (PROG) 1240. The communicating means 1230 is for communications with other devices, which may be implemented as a transceiver for transmitting/receiving signals.

In some embodiments, the device 1200 acts as a terminal device. For example, the memory 1220 stores a plurality of instructions; and the processor 1210 coupled to the memory 1220 and configured to execute the instructions to: send a message to be published for a subscription of social network service; the message includes change information of the subscription;

In some other embodiments, the device 1200 acts as a network device. For example, the memory 1220 stores a plurality of instructions; and the processor 1210 coupled to the memory 1220 and configured to execute the instructions to: receive a message to be published for a subscription of social network service; retrieve one or more subscribers following the subscription according to prestored subscription relationship information; and feed the message to the one or more subscribers following the subscription such that one or more actions associated with the change information of the subscription is/are applied on the subscribers.

The PROG 1240 is assumed to include program instructions that, when executed by the associated DP 1210, enable the device 1200 to operate in accordance with the embodiments of the present disclosure, as discussed herein with the above methods. The embodiments herein may be implemented by computer software executable by the DP 1210 of the device 1200, or by hardware, or by a combination of software and hardware. A combination of the data processor 1210 and MEM 1220 may form processing means 1250 adapted to implement various embodiments of the present disclosure.

The MEM 1220 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 1200, there may be several physically distinct memory modules in the device 1200. The DP 1210 may be of any type suitable to the local technical environment, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a network device, the method comprising:
    the network device receiving a message to be published for a first subscription of social network service, wherein the message comprises change information of the first subscription;
    the network device retrieving one or more subscribers following the first subscription according to prestored subscription relationship information; and
    the network device providing the message to the one or more subscribers following the first subscription such that one or more actions associated with the change information of the first subscription is/are applied on the subscribers, wherein
    the network device is a device via which a terminal device can access a wireless communication network,
    the network device is configured to store information regarding a relationship among a plurality of subscriptions including the first subscription, a second subscription, and a third subscription,
    the message is recorded by the second subscription which the first subscription follows, and/or, the message is recorded by the third subscription which pushes the message to the first subscription,
    the prestored subscription relationship information includes a list of Mobile Station International Subscriber Director Numbers (MSISDNs) or a list of international mobile subscriber identity (IMSIs), and
    the MSISDNs or the IMSIs identify subscribers following the subscription of the social network service.

2. The method of claim 1, wherein the method further comprises:
    scheduling a message for an automatic subscription of social network service;
    retrieving one or more subscribers following the automatic subscription according to the prestored subscription relationship information; and providing the scheduled message to the one or more subscribers following the automatic subscription.

3. The method of claim 1, wherein the method further comprises:
publishing the message to one or more terminal devices in a social network.

4. The method of claim 3, wherein the method further comprises:
receiving a register request from a terminal device; and
joining the terminal device into the social network according to the register request.

5. The method of claim 1, wherein the method further comprises:
finding one or more rules associated with the first subscription; and
applying one or more actions associated with the one or more rules on the first subscription.

6. The method of claim 5, wherein the method further comprises:
updating one or more subscription relationship according to the applied actions associated with the rules.

7. The method of claim 2, wherein the method further comprises:
triggering a provisioning message to a provisioning system.

8. The method of claim 1, wherein the method further comprises:
reducing a content of the message to acquire one or more parameters and/or one or more value pairs.

9. The method of claim 1, wherein
the subscription relationship information is prestored in a subscription relationship database, and
the subscription relationship information at least comprises a list of subscribers following the subscription and a list of subscribers being followed by the subscription.

10. The method of claim 9, wherein the subscription relationship information comprises one or more of the following: a community which the subscription belongs to or a service which the subscription has activated.

11. The method of claim 1, wherein one or more rules are used to perform the step of providing the message.

12. The method of claim 1, wherein
the message is transmitted by a provisioning system or a terminal device and comprises one or more logging requests, and
a provisioning request is transmitted to the provisioning system based on the message.

13. The method of claim 1, wherein
one or more rules are prestored in a rule engine; and
said one or more rules identify one or more of the following: an effective time span, a subscription filter, or a relation filter.

14. The method of claim 1, wherein the network device is a base station.

15. A method of operating a terminal device, comprising:
sending toward a network device a message to be published for a first subscription of social network service, wherein
the message comprises change information of the first subscription,
a subscriber following the first subscription is fed by the message and one or more actions associated with the change information of the first subscription is applied on the subscriber,
the network device is a device via which the terminal device can access a wireless communication network,
the network device is configured to obtain prestored subscription relationship information,
the network device is configured to store information regarding a relationship among a plurality of subscriptions including the first subscription, a second subscription, and a third subscription,
the message is recorded by the second subscription which the first subscription follows, and/or, the message is recorded by the third subscription which pushes the message to the first subscription,
the prestored subscription relationship information includes a list of Mobile Station International Subscriber Director Numbers (MSISDNs) or a list of international mobile subscriber identity (IMSIs), and
the MSISDNs or the IMSIs identify subscribers following the subscription of the social network service.

16. The method of claim 15, wherein one or more subscribers following an automatic subscription of social network service is/are fed by a message for the automatic subscription.

17. The method of claim 15, wherein the message is published to one or more terminal devices in a social network.

18. The method of claim 17, wherein the method further comprises:
sending a register request to a network device such that the terminal device is joined into a social network according to the register request.

19. The method of claim 15, wherein the network device is a base station.

20. A terminal device, the terminal device comprising:
a processor; and
a memory, the memory containing instructions executable by the processor wherein the terminal device is operative to:
send toward a network device a message to be published for a first subscription of social network service, wherein
the message comprises change information of the first subscription,
a subscriber following the first subscription is fed by the message and one or more actions associated with the change information of the first subscription is applied on the subscriber,
the network device is a device via which the terminal device can access a wireless communication network,
the network device is configured to obtain prestored subscription relationship information,
the network device is configured to store information regarding a relationship among a plurality of subscriptions including the first subscription, a second subscription, and a third subscription,
the message is recorded by the second subscription which the first subscription follows, and/or, the message is recorded by the third subscription which pushes the message to the first subscription,
the prestored subscription relationship information includes a list of Mobile Station International Subscriber Director Numbers (MSISDNs) or a list of international mobile subscriber identity (IMSIs), and
the MSISDNs or the IMSIs identify subscribers following the subscription of the social network service.

* * * * *